Oct. 12, 1971   O. HOWARD   3,611,691
RAKE ATTACHMENT FOR ROTARY POWER MOWER
Filed May 28, 1970   2 Sheets-Sheet 1

INVENTOR.
ORVEL HOWARD
BY *Polachek & Saulsbury*
ATTORNEYS

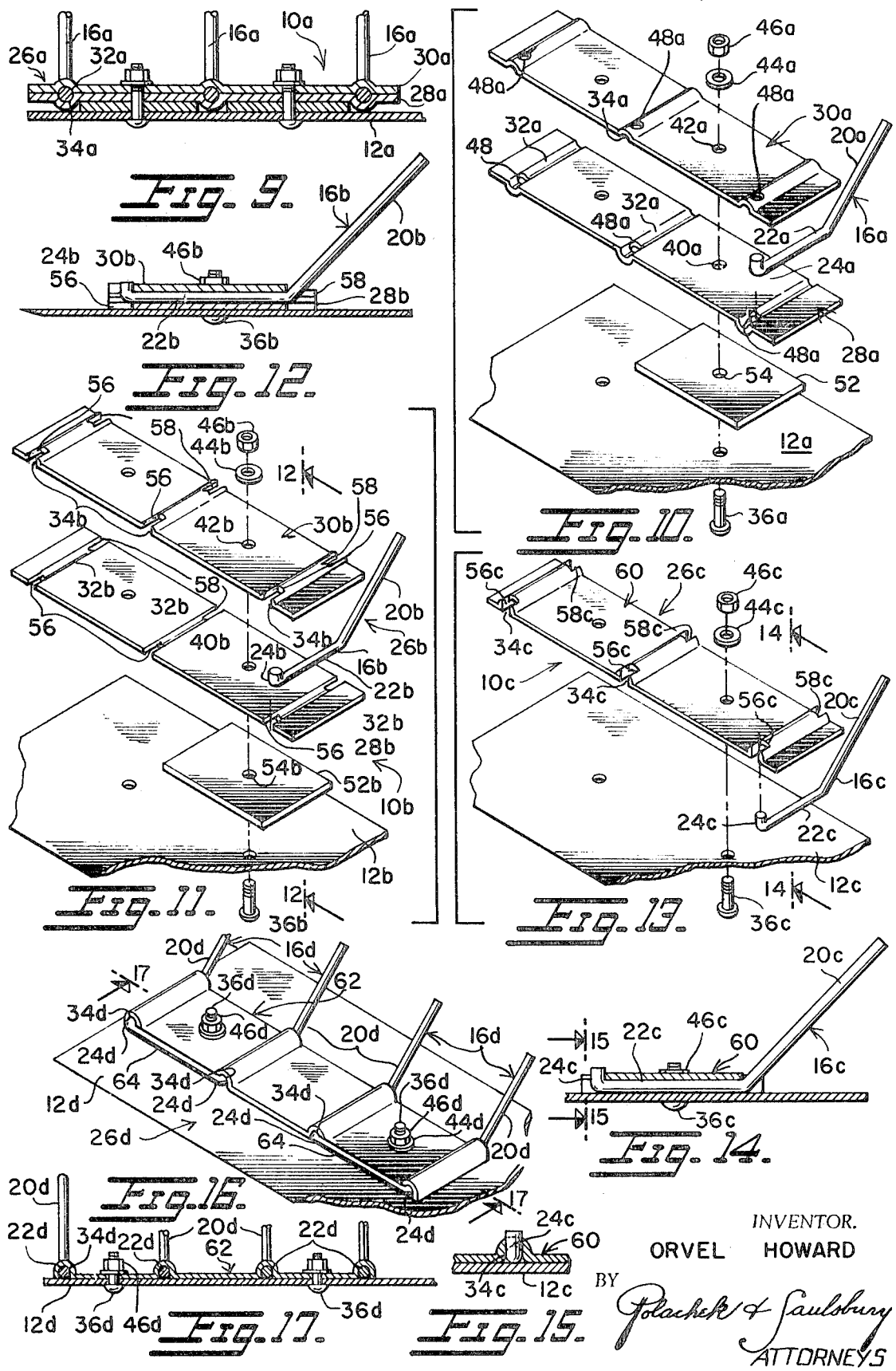

United States Patent Office 3,611,691
Patented Oct. 12, 1971

3,611,691
RAKE ATTACHMENT FOR ROTARY POWER MOWER
Orvel Howard, P.O. Box 222, Rock Falls, Ill. 61071
Filed May 28, 1970, Ser. No. 41,382
Int. Cl. A01d 81/00
U.S. Cl. 56—367
10 Claims

ABSTRACT OF THE DISCLOSURE

A plurality of spaced parallel tines project beneath the trailing edge of a rotary motor blade. Each tine includes a substantially straight generally horizontal portion which is secured to the undersurface of the mower blade by a clamping mechanism. The tine projects from the horizontal portion downwardly and at an angle to the horizontal mower blade. Each tine also includes a tip portion adjacent the end of the horizontal portion which is bent to lie in a plane perpendicular to the longitudinal axis of the horizontal portion. This end tip is secured by a clamping mechanism to prevent rotation of the tine within the clamping mechanism. Various clamping mechanisms include at least one plate having spaced parallel channels which accommodatingly receive the horizontal portions of the tines. The tines may be either received between two such plates or clamped between the undersurface of the mower blade and a single plate. A notch in one of the channeled plates accommodates the bent tip at the end of the horizontal portion and thus prevents rotation of the tine. In an alternate embodiment, two tines are joined by a single reach at the distal end of the horizontal portions which acts as a stabilizer in lieu of the bent tip portions.

---

Power raking devices attached to rotary mower blades.

In order to relieve the burden of raking cut grass when a lawn is mowed, grass catching attachments constituting bags which are secured behind a reel type mower or to the ejection chute of rotary type mowers have been employed. Although the grass catching bags do catch much of the freshly cut grass, they do not additionally provide means for raking or clearing the lawn of debris which is located beneath the cut edge of the grass, i.e. beneath the mower blade. Thus one was still required to subsequently rake the lawn with either a hand rake or a lawn sweeper.

Presently used lawn sweepers are devices which include a horizontally oriented cylinder having radially projecting bristles and mounted for rotation in a plane generally parallel to the surface of the lawn. These devices are generally pushed manually and, as they are pushed, the cylinder and bristles rotate to brush debris which is found on the lawn into a catcher bag positioned behind the cylinder. These lawn sweepers left much to be desired because they necessitated manually walking over the lawn which was freshly cut. Furthermore, these devices are seldomly accompanied with a power assist. Thus, the homeowner or gardener was required to go over the lawn two times in essence, the first time cutting it with his mower and the second time sweeping the lawn, catching any debris as well as grass clippings.

It is an object of the present invention to provide a rake attachment for a rotary power mower which is not subject to the foregoing disadvantages.

More specifically, it is an object of the present invention to provide a rake attachment device of the general character described which may be operated with great facility, is lightweight, durable, and well suited for mass production manufacture.

A further object of the present invention is to provide a rake attachment of the general character described which will clean debris, twigs, cut grass, leaves, etc., from between the blades of grass beneath a rotating rotary cutter blade.

A still further object of the present invention is to provide a rake attachment which includes a plurality of tines which project downwardly from the trailing edge of a rotary mower blade and which sweep debris from a lawn.

A still further object of the present invention is to provide a rake attachment for a rotary mower which includes a clamping device for clampingly positioning a plurality of tines beneath the cutting edge of a rotary mower blade so that the tines extend downwardly therefrom and are in parallel spaced interrelationship.

Other objects of the invention in part will be obvious and in part will be pointed out hereinafter.

The invention accordingly consists in the features of construction, combinations of elements and arrangements of parts which will be exemplified in the rake attachment hereinafter described and of which the scope of application will be indicated in the appended claims.

In the accompanying drawings in which are shown some of the various possible embodiments of the invention:

FIG. 9 is a sectional view taken substantially along the longitudinal axis of a mower blade and showing an alternate embodiment of the invention.

FIG. 10 is a fragmentary exploded perspective view of the embodiment shown in FIG. 9 and includes a spacer plate which is secured between the blade and the base plate.

FIG. 11 is a fragmentary exploded perspective view of a still further embodiment of the invention wherein the tips and angular portions of the tines are received within slots formed in the cover plate, and furthermore, the base plate is spaced from the undersurface of the mower blade by a spacer plate.

FIG. 12 is a fragmentary sectional view taken substantially along the line 12—12 of FIG. 11.

FIG. 13 is an exploded fragmentary perspective view of a further embodiment of the invention wherein a single cover plate is utilized to clamp the tines in position and with a tip of the tine engaged in a slot of the cover plate to prevent rotation of the tine.

FIG. 14 is a sectional view taken substantially along the line 14—14 of FIG. 13 but showing the rake attachment in assembled form and further illustrating a second slot in the cover plate which receives an angular portion of a tine to further guard against rotation of a tine.

FIG. 15 is a fragmentary sectional view taken substantially along the line 15—15 of FIG. 14.

FIG. 16 is a fragmentary perspective view of a final embodiment of the invention wherein adjacent tines are joined together by a reach which prevents rotation of the tines within the mounting clamp.

FIG. 17 is a fragmentary sectional view taken substantially along the line 17—17 of FIG. 16 and showing the mounting clamp in more detail, illustrating a single cover plate with horizontal portions of each tine secured in a channel formed in the cover plate.

The power rake attachment of the present invention is suitable for mounting to the undersurface of a cutting blade of a rotary power mower. The attachment includes a plurality of tines which extend downwardly beneath the blade and which comb through the cut grass while the mower is operating. The tines pick up loose twigs, cut grass, weeds, vines, leaves and other debris which are lodged between the blades of grass. Because the tines rotate with the power mower blade they throw the collcted debris through the discharge chute of the power mower and the mower may be used with or without a grass catcher bag. Additionally, the rake attachment may be utilized when the discharge chute of the rotary mower is sealed. With the discharge chute closed, the tines act as a mulcher and finely chop any leaves or other debris which are beneath the level of the cut grass.

Figure 8:
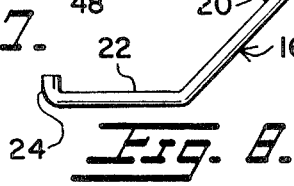
FIG. 8 is an elevational view of a tine.

Referring now in detail to the drawings, the reference numeral 10 denotes a rake attachment constructed in accordance with and embodying the invention. The attachment 10 is adapted to be mounted to the undersurface of a blade 12 of a rotary mower 14. The attachment 10 includes a plurality of tines 16 best illustrated in FIG. 8. The tines are arranged in rows and are spaced parallel to one another adjacent each end 18 of the blade 12.

Figure 3:
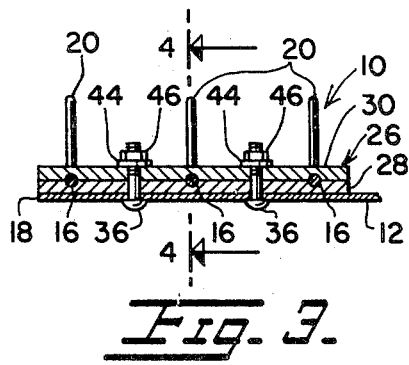
FIG. 3 is a fragmentary enlarged sectional view taken substantially along the line 3—3 of FIG. 2 and showing, in more detail, a typical clamping mechanism which secures the tines to the mower blade.
Figure 1:
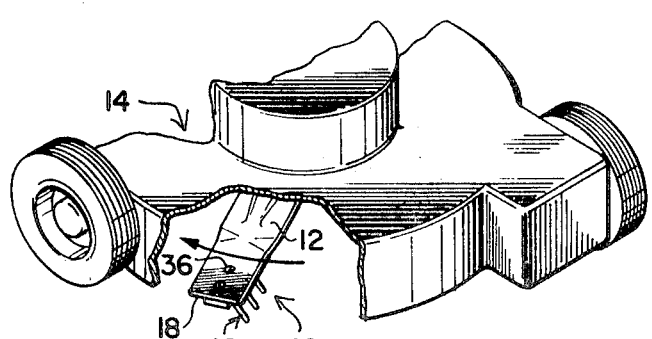
FIG. 1 is a fragmentary perspective view of a rotary power mower with portions thereof broken away to show a typical application of the rake attachment.
Figure 2:
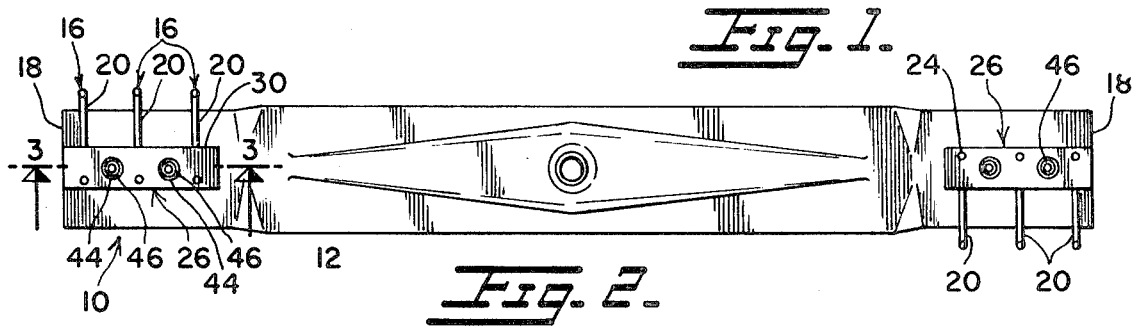
FIG. 2 is a plan view of the undersurface of a cutting blade which is mounted in the undercarriage of the rotary mower shown in FIG. 1 and showing the power rake attachment which includes a plurality of tines and a clamping mechanism securing the tines to the blade.

In the typical installation illustrated in FIG. 2 the tines 16 are each formed of approximately ⅛" diameter spring steel wire and are spaced apart approximately one inch. Of course the size of each tine and the distance between successive tines as well as the number of tines in a single row may vary in accordance with the conditions of use. Therefore closer spacing between successive tines is contemplated as well as increasing the number of tines in a single row.

As was previously mentioned the tines are preferably constructed of spring steel. However, various other equivalent structures may be used and additionally the construction of tines of other stock materials such as a suitable synthetic plastic e.g. polyethylene, polyvinylchloride, etc. is contemplated. Tines constructed of somewhat resilient plastics will, of course, produce the desired raking effect while increasing the safety of the raking operation.

The tines 16 are formed with an angular portion 20 which extends at approximately 45° from a generally horizontal portion 22. The horizontal portion 22 is of circular transverse cross section. At the end of the horizontal portion 22 a tip portion 24 is bent to extend perpendicularly from the longitudinal axis of the horizontal portion 22. The tip portion 24, the angular portion 20 and the horizontal portion 22 are coplanar.

The tines 16 are mounted on the undersurface of the blade 12 by a clamping mechanism 26. The clamping mechanism 26 includes a substantially rectangular base plate 28 and a registered cover plate 30. Each of the plates 28, 30 include spaced parallel grooves 32, 34 respectively, which extend in a direction perpendicular to the longitudinal axis of each plate and within the mating abutting surfaces of each plate. A pair of registered grooves 32, 34 form a channel within which the horizontal portion 22 of a tine 16 may be captively retained. Each plate 28, 30 is identical in construction to lower manufacturing costs.

In order to tightly engage the horizontal portions 22, the plates 28, 30 are brought tightly together through the use of a pair of bolts 36 which extend through registered openings 38, 40, 42 in the mower blade, the base plate 28 and the cover plate 34 respectively. It should be observed that the opening 38 will, in most instances, be drilled through the mower blade when the attachment 10 is first installed. On the shank end of each bolt 36, a lock washer 44 is placed and subsequently a nut 46 is utilized to engage the threaded portion of the shank.

It will be observed that tightening of the nut will increase the pressure forcing the plates 28, 30 together and hence increase the pressure of each groove 32, 34 on the horizontal portion 22 of a tine. It should also be noted that the grooves 32, 34 and hence the channel is of a diameter slightly smaller e.g. 1/32" than the diameter of the tine to insure that the tine will be tightly engaged.

Figure 4:
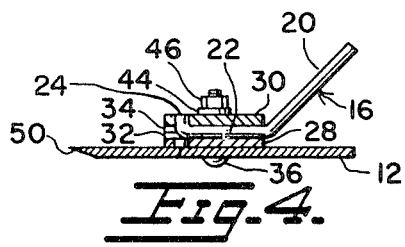
FIG. 4 is a fragmentary sectional view taken substantially along the line 4—4 of FIG. 3 and further illustrating the clamping mechanism and the manner in which a tip of the tine is held by the clamping mechanism to prevent rotation of a tine within the clamping mechanism.
Figure 6:
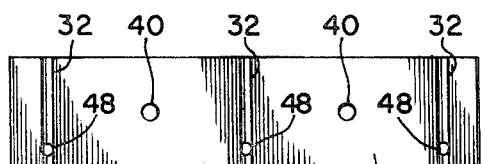
FIGS. 6 and 7 are plan views of the base and cover plates respectively.
Figure 5:
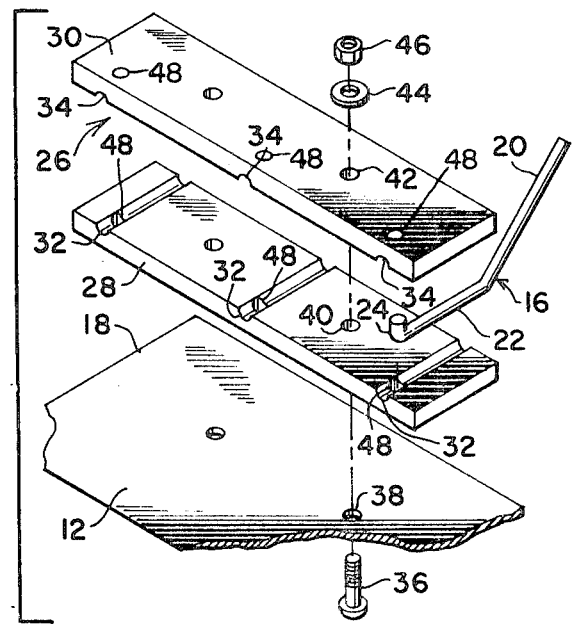
FIG. 5 is a fragmentary exploded perspective view of the attachment illustrated in FIGS. 1-4 with two tines removed for clarity and showing the clamping mechanism including a base plate which is adjacent the mower blade and a cover plate which is secured over the tines and abuts the base plate.
Figure 7:
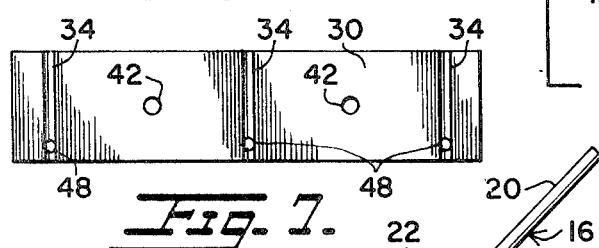

As was previously mentioned, the tip portion 24 of each tine is bent in a direction perpendicular to the longitudinal axis of the horizontal portion 22 of the tine 16 to prevent rotation of the horizontal portion of the tine within a channel. This tip portion 24 engages a circular well 48 (see FIGS. 4–6) which extends into the cover plate 30 from a channel 34 in a direction perpendicular to the longitudinal axis of the channel 34. The engagement between the opposite side walls of each well 48 and the tip portion 24 of a tine will prevent rotation of the tine.

With the rake attachment above described, secured to the undersurface of a rotary mower blade and with the angular portion 20 extending beneath the blade at the trailing edge thereof, the lawn will be swept clear of debris at the same time as the grass is being cut by the forward or cutting edge 50 of the blade 12.

A further embodiment of the invention wherein the tine clamping mechanism is slightly modified is illustrated in FIGS. 9 and 10. This embodiment includes a rake attachment 10a which is secured to the undersurface of a lawn mower blade 12a and includes a plurality of tines 16a. The tines 16a are identical in construction to the tines 16 previously described. This embodiment differs however from the embodiment previously described because the tines 16a are secured to the blade 12a in a different manner. A clamping mechanism 26a is provided for securing the tines to the blade. In this clamping mechanism, a base plate and a cover plate 28a, 30a, respectively, are provided. The plates 28a, 30a are similar to the plates 28, 30 of previously described embodiment, however, they include a plurality of parallel spaced grooves 32a, 34a which are formed in the plates by a stamping or coining process whereby the rear surface of the plates opposite the grooves are ridged in a corresponding curvilinear manner.

In order to permit the plates 28a, 30a to be secured tightly to the undersurface of the blade 12a and at the same time tightly and clampingly engaging the tines 16a, a plurality of spacer plates 52 are provided. Each spacer plate 52 is positioned between a pair of ridges in the base plate 28a and is secured in such position between the base plate 28a and the undersurface of the mower blade 12a through the use of a bolt 36a which extends through an opening 54 in the spacer plate. A lock washer 44a and nut 46a are secured to the threaded shank of the bolt 36a to tighten the clamping mechanism 26a. It should also be noted that the tip portions 24a of each tine 16a engages a well 48a in a groove 34a to prevent rotation of the tine. Both plates 28a, 30a are identical in construction.

A still further embodiment of the invention is illustrated in FIGS. 11 and 12. In this embodiment which is similar to the embodiment most recently described, a rake attachment 10b is illustrated. The attachment includes a clamping mechanism 26b for securing a plurality of tines 16b to the undersurface of a power mower blade 12b. The clamping mechanism 26b includes a base plate 28b and a cover plate 30b which are similar in construction to the plates 28a, 30a previously described, and include spaced parallel grooves 32b, 34b. The plates 28b, 30b are secured to the blade 12b by a bolt 36b which extends through registered openings in a spacer 52b (similar in construction to a spacer 52) and the plates 28b, 30b. This embodiment is distinguished from the embodiment most recently described because a notch or notched well 56 is formed at the ends of the grooves 34b in lieu of circular wells 48. The tip portion 24b of each tine 16b is seated within the notched well 56 to prevent rotation of the tine. Furthermore, the opposite ends of the grooves 34b in the plate 30b include similar notched wells or notches 58. Both plates 28b, 30b are identical.

It should be noted at this time that the tines 16b include a horizontal portion 22b which is shorter in length than the horizontal portion 22 and 22a of the previous embodiments. Thus, an angular portion 20b of the tines 16b will project from the longitudinal axis of the horizontal portion before the end of the groove 34b. In fact, the horizontal portion 20b projects through the notch 58. Therefore the tine is prevented from rotating not only by the notch 56 which engages the tip portion 24b but also by the notch 58 which engages the angular portion 20b.

Alternately, this embodiment may include tines 16b identical in structure to the tines 16 and 16a with the plates 28b and 30b of a greater width so that the groove 34b is of a total length longer than the length of the horizontal portion 22b of a tine 16b. Therefore, the angular portion 20b of the tine 16b will project through the notch 58.

A still further embodiment of the invention is illustrated in FIG. 13. This embodiment is similar in construction to the embodiments previously disclosed and includes a rake attachment 10c for a power mower which is mounted to the undersurface of the mower blade 12c and includes a tine 16c similar in construction to the tine previously described. A clamping mechanism 26c is different in construction than the clamping mechanisms previously described, because a single plate 60 is utilized. The plate 60 is similar in construction to the cover plate 30b. The plate 60 includes a plurality of grooves 34c which engage the horizontal portion 22c of a tine 16c. The plate 60 is designed to tightly grip the tines and hold them between the grooves 34c and the undersurface of the mower blade 12c.

It should also be noted that the grooves 34c include notches 56c, 58c at each end thereof. When the rake attachment is assembled, the tip portion 24c of a tine 16c will be engaged in a notch 56c while the angular portion 20c of the tine 16c will be engaged in the notch 58c. Thus the tine is prevented from rotating by engagement with portions thereof in each of the notches 56c, 58c.

A final embodiment of the invention is illustrated in FIGS. 16 and 17. In this embodiment, an alternate structure is provided for preventing rotation of tines 16d within a clamping mechanism 26d. The clamping mechanism 26d includes a plate 62 similar in construction to the plate 60 which formed the clamping mechanism in a previously described embodiment. The plate 62 includes a plurality of transverse grooves 34d and is distinguished from the plate 60 due to the fact that there are no notches at the end of the grooves. In order to prevent rotation of the tines 16d within the grooves 34d, the tines are modified in structure.

Specifically, the tines are grouped in pairs with the tip portions 24d of adjacent tines interconnected by a reach 64. Actually, two tines forming an interconnected pair are bent from a single wire or, if the tines are formed of molded synthetic plastic or other material they may be suitably molded in the desired shape with a reach 64 interconnecting adjacent tip portions 24d. It should also be noted that the tip portions 24d of the tines are bent to lie in a plane perpendicular to a plane within which the angular and horizontal portions 20d, 22d of the tine 16d lie. Furthermore, the tip portions 24d of adjacent tines are bent to face one another. It should also be noted in passing that in this embodiment two pairs of tines (four tines) are mounted adjacent each cutting end of the mower blade.

Thus it will be seen that there is provided a rake attachment for a rotary power mower which achieves the various objects of the invention and which is well adapted to meet the conditions of practical use.

As various possible embodiments might be made of the present invention and as various changes might be made in the embodiments above set forth, it is to be understood that all matter herein described or shown in the accompanying drawings is to be interpreted as illustrative and not in a limiting sense.

What is claimed is:

1. A rake attachment for a rotary power mower, said attachment comprising a plurality of tines, each of said tines having a generally horizontal portion and a coplanar angular portion, a clamping mechanism mounting the plurality of tines to a rotary mower blade, the clamping mechanism including a plate, means forming spaced parallel grooves, in said plate, the grooves extending in a direction transverse to the longitudinal axis of the mower blade, the horizontal portion of one of the tines being received within a groove of the plate, means clampingly engaging the plate against the tines and securing the plate to the mower blade, the angular portion of each tine depending from the trailing edge of the mower blade, whereby the angular portions of each tine will extend beneath the mower blade and rake particles while the mower is operating.

2. A rake attachment constructed in accordance with claim 1, wherein the horizontal portion of each tine is circular in transverse cross-section and means is provided for preventing each tine from rotating within its associated groove.

3. A rake attachment constructed in accordance with claim 2, wherein an end of each horizontal portion includes a tip portion, the tip portion extending in a direction inclined from the longitudinal axis of the horizontal portion, the means for preventing the tine from rotating including means receiving the tip portion of each tine and restraining movement of said tip portion.

4. A rake attachment constructed in accordance with claim 3, wherein the means receiving the tip portion includes means forming a well in the plate at an end of each groove, the tip portions of each tine being received within its associated well.

5. A rake attachment constructed in accordance with claim 4, wherein the plate is secured to the undersurface of the mower blade, the means preventing each tine from rotating within its associated groove includes means forming wells at the other end of each groove, the angular portion of each tine extending into its associated last mentioned well.

6. A rake attachment constructed in accordance with claim 1, wherein the plate is a cover plate clamping mechanism further including a base plate, the cover and base plates being registered, means forming parallel grooves in the base plate, the corresponding grooves in each plate forming channels, the base plate being positioned between the cover plate and the lawn mower blade, the channel being of a size to tightly accommodate the horizontal portion of a tine.

7. A rake attachment constructed in accordance with claim 6, wherein the horizontal portions of the tines are circular in transverse cross section and means preventing the tines from rotating within their associated channels is provided.

8. A rake attachment constructed in accordance with claim 7, wherein each of the tines includes a tip portion at the end of its horizontal portion, each tip portion extending in a direction inclined from the longitudinal axis of the horizontal portion, the means for preventing the tines rotating within their associated channels including wells formed in one of the plates within its grooves, the tip portion of each tine being captively received within its associated well and being restrained by the side walls of the well.

9. A rake attachment constructed in accordance with claim 8, wherein the wells are notched, the means preventing the tines from rotating further including means forming notched wells in the other plate, the last mentioned notched wells being spaced from the first mentioned notched wells, the angular portion of each tine extending into the last mentioned notched wells, the plates being secured to the undersurface of the blade.

10. A rake attachment constructed in accordance with claim 2, wherein a tip portion is formed at the end of the horizontal portion of each tine, the tip portions extending in a plane perpendicular to the plane of its associated horizontal and angular portions, the means preventing the tines from rotating within their associated grooves including a reach, the reach being unitarily formed with adjacent tip portions and extending therebetween.

References Cited
UNITED STATES PATENTS

| | | | |
|---|---|---|---|
| 3,117,633 | 1/1964 | Hosek | 56—295 X |
| 3,367,093 | 2/1968 | Zwickel | 56—27 |

LOUIS G. MANCENE, Primary Examiner

J. N. ESKOVITZ, Assistant Examiner

U.S. Cl. X.R.

56—295